Patented Jan. 30, 1934

1,944,873

UNITED STATES PATENT OFFICE 1,944,873

SMELTING SULPHIDE ORE

Raymond F. Bacon, Bronxville, N. Y.

No Drawing. Application December 31, 1930
Serial No. 505,989

11 Claims. (Cl. 23—226)

This invention relates to the recovery of sulphur and has for an object the provision of an improved process for recovering sulphur from sulphide ores. More particularly, the invention relates to a process wherein the sulphur recovery involves a smelting operation.

It has been suggested heretofore to produce elemental sulphur by subjecting pyrites to a blast furnace smelting operation with the provision of sufficient carbon to yield the sulphur in elemental form rather than as the usual sulphur dioxide. The nature of the operation is such, however, that it is very difficult to control the various conditions with sufficient accuracy to obtain the sulphur substantially completely in elemental form in the furnace. As a consequence, the exit gases contain, along with the elemental sulphur, material amounts of unreacted sulphur dioxide, as well as carbon dioxide, carbon monoxide, etc.

In order to promote further progress of the sulphur producing reactions and reduce the quantity of sulphur dioxide present, it has been proposed further, to pass these exit gases in contact with a catalyst under suitable conditions to bring about further reaction. Thereafter the elemental sulphur is condensed and separated from the waste gases. Even with this supplementary catalytic treatment, however, appreciable amounts of sulphur dioxide are frequently left in the waste gases, and upon being discharged into the atmosphere constitute a highly objectionable nuisance.

It is a further object of my invention to provide a process utilizing a smelting type of operation to yield the sulphur substantially in the elemental form, but in which process the unreacted sulphur dioxide is substantially completely recovered with the elimination of supplemental catalytic treatment of the furnace gases if desired.

The manner in which I accomplish the same consists briefly, in extracting the sulphur dioxide from the furnace gases by means of lime, calcium sulphite being thereby produced, and utilizing this calcium sulphite as a source of the lime required for slag formation in the smelting operation, the sulphur dioxide released upon decomposition of the sulphite being thereupon subjected to the intensely reducing action in the furnace and serving also as a source of enrichment of the sulphur dioxide gases in the furnace. With the use of this lime-extraction step, the suggested supplementary catalytic treatment of the furnace gases may be dispensed with, but if so desired, such treatment may be retained and the extraction of the sulphur dioxide with lime restricted to the waste gases from the catalytic chamber, thereby preventing the escape of residual sulphur dioxide into the atmosphere.

A specific procedure illustrative of the process of my invention is as follows:

A blast furnace smelter of any well-known type, for example, the common water jacketed pyritic smelter, will serve the purpose of my process, but preferably provision is made therein for running the furnace with a closed top to prevent the ingress of air during feeding. For this purpose any suitable and well-known type of air-sealing construction for the feeding device, of which there are many, may be utilized. With the use of a closed top, the only air which will have access to the charge will be that blown in in regulated amounts through the tuyères.

The pyrites charge for the furnace may be of any common type, for example, a pyrites-chalcopyrites charge. To the pyrites is added a suitable amount of silica and of calcium sulphite, produced as described hereinafter, to suffice for the formation of an iron calcium silicate slag.

In addition coke or other suitable carbonaceous material is added as in the usual smelting operation, but in such additional quantity as to provide sufficient reducing agent for the reduction of the sulphur dioxide generated in the smelting proper, as well as that liberated from the calcium sulphite upon its decomposition.

The charge is then introduced into the furnace without the ingress of air during the operation, and the desired depth of bed is controlled by periodic additions of fresh material as the operation proceeds. Air is blown in through the tuyères in the well-known manner, to provide the essential temperature and attendant smelting conditions by the combustion of sulphur in the lower part of the furnace, resulting in the production of sulphur dioxide.

In its passage upwardly through the furnace, the sulphur dioxide so produced, as well as that resulting from the decomposition of the calcium sulphite to lime, will tend to be reduced in the strongly reducing atmosphere in the upper regions of the furnace, and the elemental sulphur resulting therefrom together with the volatilized free sulphur atom of the pyrites, will pass off through the gas outlet.

In addition to a large quantity of elemental sulphur, the exit gases will generally contain, as noted hereinbefore, appreciable amounts of sulphur dioxide, along with some carbon monoxide, carbon dioxide, dust, etc.

Upon being discharged from the furnace, these exit gases are conducted to a suitable dust collector, for example, a mechanical separator such as a baffle chamber, or an electrostatic precipitator, and the dust-free gases are passed on for further treatment.

In that modification of the process of my invention, wherein the former catalytic treatment of the furnace gases is dispensed with, the gases from the dust collector are then conducted to a condenser to condense and separate the elemental sulphur. This may be accomplished by means of a waste heat boiler in which the sulphur is condensed and may be drawn off. If desired, an electrostatic precipitator may be utilized after the waste heat boiler to throw down any sulphur mist that may remain in the gases after the principal condensation.

The effluent gases from the condenser are then conducted to an absorber containing milk of lime by which the sulphur dioxide is extracted to form calcium sulphite. Some calcium carbonate will also be formed by the carbon dioxide in the gases, although this will partially at least, be itself converted to calcium sulphite by the action of the sulphur dioxide. The presence of calcium carbonate with the sulphur, however, is not objectionable for limestone is the usual form in which lime is provided for slagging purposes. Any hydrogen sulphide will react with sulphur dioxide in the lime tower to form solid sulphur, which will be collected with the $CaSO_3$ and will go back in the furnace to be distilled out with other elemental sulphur.

The milk of lime may be prepared by calcining limestone, finely pulverizing the lime so obtained, and suspending it in water.

The absorber in which the sulphur dioxide gases are brought in contact with the milk of lime may be of any suitable type. One effective construction comprises a tower provided with plates which extend slightly more than halfway across the tower and are arranged in staggered relationship from the top to bottom of the shaft. These plates have a slight downward inclination and upon the introduction of the milk of lime at the top of the tower, it will pass downwardly in a sinuous course, the liquid being cascaded over the edge of each plate in the form of a thin film, and onto the next succeeding plate. The sulphur dioxide gases pass upwardly through the tower under either natural or forced draught, in counter-current relationship to the flow of the liquid, and are brought in very intimate contact with the milk of lime.

The sulphur dioxide can be substantially completely absorbed in a single passage through a properly constructed tower, although if necessary a series of the same may be used until the extraction has proceeded to a satisfactory degree. The milk of lime solution may be passed through the tower any desired number of times to obtain a satisfactory calcium sulphite concentration, or where a series of towers is used it may be passed progressively from the last tower where the sulphur dioxide is weakest, to the initial tower where it is most concentrated.

The waste gases from the lime-extraction operation are quite free of sulphur dioxide and may be discharged directly into the atmosphere.

The exhausted milk of lime suspension from the extraction operation, containing calcium sulphite, calcium carbonate, and some residual lime, is separated from the accompanying liquor by filtration in a filter press, decantation, or in any other suitable manner.

After the filtration step, the solid residue will generally be sufficiently dry to permit its use directly in the smelting operation. While some small amount of water may be present therein, this is not deleterious, for any hydrogen sulphide that may be formed therefrom will react with the sulphur dioxide to yield elemental sulphur.

Where decantation is resorted to, the solid residue may under some circumstances contain an excessive amount of water and accordingly, the material should be dried, at least to some extent, before being used in the smelting operation. When the sulphide ore and the slagging material are to be used in the form of agglomerates, however, even this drying of the residue may be dispensed with as a certain amount of liquid is necessary for the agglomeration.

The solid calcium sulphite residue, obtained as described, together with such amounts of calcium carbonate and lime as may also be present therein, is mixed with the ore charge in suitable proportion to provide the required quantity of lime, and quantitative provision is made in the carbonaceous reducing agent to react with the additional sulphur dioxide contained in the sulphite.

In that modification of my process wherein the supplementary catalytic treatment is used, the effluent gases from the dust collector are conducted to a catalytic chamber containing a catalyzer, such as porous alumina or bauxite, wherein further reaction takes place to yield an additional amount of elemental sulphur. The temperature in the catalytic chamber should be maintained at a point sufficiently elevated to favor the reaction as well as to maintain the sulphur in vapor form and prevent its condensation upon the catalyst. A temperature of from 300 to 450° C. ordinarily will suffice for this purpose.

The major reaction which occurs in the catalytic chamber is as indicated by the equation:

$$2CO+SO_2=2CO_2+S$$

although other auxiliary sulphur producing reactions also take place, between the sulphur dioxide and hydrogen sulphide for example, or between sulphur dioxide and carbon bisulphide or carbon oxysulphide.

After leaving the catalytic chamber, the gases are conducted to a waste heat boiler or other condenser in which the sulphur is condensed and drawn off, and if desired this condensation may be supplemented by the subsequent use of an electrostatic precipitator to remove any sulphur which escapes the principal condensation treatment.

The residual gases from the sulphur separation step contain varying amounts of sulphur dioxide, hydrogen sulphide, carbon dioxide, carbon monoxide, etc. To recover this sulphur dioxide and to prevent its objectionable discharge into the atmosphere, these gases are then subjected to the lime-absorption step described hereinbefore. The manner in which this step is carried out is substantially the same as in the first described modification, although as a result of the lower sulphur dixodie concentration, it will be necessary to contact the milk of lime solution with a larger quantity of gas to obtain a satisfactory amount of calcium sulphite. Any hydrogen sulphide will react with sulphur dioxide in the lime tower to form solid sulphur, which will be collected with the $CaSO_3$ and will go back in the furnace to be distilled out with other elemental sulphur.

The calcium sulphite so formed is likewise utilized as a source of slagging material for the smelting operation, either exclusively or as a supplement to the usual limestone, and the waste gases from the extraction treatment may be discharged directly into the atmosphere.

By proceeding in accordance with the foregoing, an efficient and economical solution of the sulphur recovery problem is presented, wherein the sulphur is substantially completely recovered, and if in the form of sulphur dioxide, is continually maintained in the cycle of operations where it will be further subjected to reaction tending to produce additional quantities of elemental sulphur. Concurrently with this retention of the sulphur dioxide the usual noxious gas nuisance is thoroughly overcome.

While I have disclosed a specific embodiment of my invention, various changes may be embodied therein and other uses made thereof. Illustrative of some of these, calcium carbonate may be substituted for the lime in the extraction step, although the lime is more effective. The corresponding magnesium compounds may likewise be substituted for those of calcium, although magnesia is not ordinarily used as a slagging material. The calcium sulphite need not be exclusively formed in the same operation in which it is used; it may, for example, be formed from the dilute gases produced when ores of low sulphur content are being treated, and then used to supplement the calcium sulphite slagging material produced in a separate smelting operation, such as that described herein, where an ore of high sulphur content is being smelted to produce elemental sulphur. The calcium sulphite formed as noted herein may in addition be used as a slagging material to increase the sulphur dioxide concentration in smelter gases in smelting operations where other objects than the production of elemental sulphur are sought, the production of liquid sulphur dioxide for example.

The application of the process of my invention to pyrites as described herein is intended merely to be illustrative and not limiting for other sulphide ores of lesser sulphur content may be utilized, for example the pyrrhotites, the copper nickel sulphide ores of the Sudbury District, etc.

I claim as my invention:

1. The process of producing elemental sulphur from sulphide ores which comprises, smelting a mixture of ore, carbonaceous reducing agent in amount sufficient to reduce a substantial part of the sulphur dioxide formed to elemental sulphur, and slagging material, separating the elemental sulphur from the accompanying smelter gases, contacting said gases with a basic slag-forming material whereby it will be converted to sulphite by sulphur dioxide in said gases, and returning said sulphite to the smelting operation as a source of slagging material.

2. The process of producing elemental sulphur from sulphide ores which comprises, smelting a mixture of ore, carbonaceous reducing agent in amount sufficient to reduce a substantial part of the sulphur dioxide formed to elemental sulphur, and slagging material comprising a sulphite, separating the elemental sulphur from the accompanying smelter gases, contacting said gases with a basic slag-forming material whereby it will be converted to sulphite by sulphur dioxide in said gases, and returning said sulphite to the smelting operation as a source of slagging material.

3. The process of producing elemental sulphur from sulphide ores which comprises, smelting a mixture of ore, carbonaceous reducing agent in amount sufficient to reduce a substantial part of the sulphur dioxide formed to elemental sulphur, and slagging material, separating the elemental sulphur from the accompanying smelter gases, contacting said gases with lime whereby it will be converted to calcium sulphite by sulphur dioxide in said gases, and returning said calcium sulphite to the smelting operation as a source of slagging material.

4. The process of producing elemental sulphur from sulphide ores which comprises, smelting a mixture of ore, carbonaceous reducing agent in amount sufficient to reduce a substantial part of the sulphur dioxide formed to elemental sulphur, and slagging material comprising calcium sulphite, separating the elemental sulphur from the accompanying smelter gases, contacting said gases with lime whereby it will be converted to calcium sulphite by sulphur dioxide in said gases, and returning said calcium sulphite to the smelting operation as a source of slagging material.

5. The process of producing elemental sulphur from sulphide ores which comprises, smelting a mixture of ore, carbonaceous reducing agent in amount sufficient to reduce a substantial part of the sulphur dioxide formed to elemental sulphur, and slagging material comprising calcium sulphite, said reducing agent being provided in an amount sufficient to obtain the sulphur substantially in elemental form, subjecting the smelter gases to a dust collection operation, condensing and separating the elemental sulphur in said gases, contacting said gases with milk of lime whereby the lime will be converted to sulphite by sulphur dioxide in the gases, separating the sulphite from the accompanying liquid, and returning said sulphite to the smelting operation as a source of slagging material.

6. In a process of producing elemental sulphur from sulphide ores by a smelting operation, the steps which comprise contacting a basic slag-forming material with sulphur dioxide to convert said material to the sulphite form, and introducing said sulphite in a smelting operation as a source of slagging material and enrichment of the sulphur dioxide gases.

7. The process of producing elemental sulphur from sulphide ores which comprises, smelting a mixture of ore, carbonaceous reducing agent and slagging material, said reducing agent being provided in sufficient amount that the sulphur will be obtained to a substantial extent in the elemental form, separating the elemental sulphur from the accompanying smelter gases, contacting said gases with a basic slag-forming material of the nature of lime whereby said material will be converted to sulphite by sulphur dioxide in said gases, and returning the sulphite to the smelting operation as a source of slagging material.

8. The process of producing elemental sulphur from sulphide ores which comprises, smelting a mixture of ore, carbonaceous reducing agent in amount sufficient to reduce a substantial part of the sulphur dioxide formed to elemental sulphur, and slagging material, passing the smelter gases containing said elemental sulphur in contact with a catalyst capable of accelerating further reduction of the sulphur dioxide in said gases to produce elemental sulphur, separating the elemental sulphur from the accompanying gases, contacting said gases with a basic slag-forming material whereby it will be converted to the sulphite form by sulphur dioxide in said gases, and returning said sulphite to the smelting operation as a source of slagging material.

9. The process of producing elemental sulphur from sulphide ores which comprises, smelting a mixture of ore, carbonaceous reducing agent in amount sufficient to reduce a substantial part of the sulphur dioxide formed to elemental sulphur, and slagging material, passing the smelter gases containing said elemental sulphur in contact with a catalyst capable of accelerating further reduction of the sulphur dioxide in said gases to produce elemental sulphur, separating the elemental sulphur from the accompanying gases, contacting said gases with lime whereby it will be converted to calcium sulphite by sulphur dioxide in said gases, and returning said sulphite to the smelting operation as a source of slagging material.

10. The process of producing elemental sulphur from sulphide ores which comprises, smelting a mixture of ore, carbonaceous reducing agent in amount sufficient to reduce a substantial part of the sulphur dioxide formed to elemental sulphur, and slagging material, separating the elemental sulphur from the accompanying smelter gases, contacting said gases with calcium carbonate whereby it will be converted to calcium sulphite by sulphur dioxide in said gases, and returning said calcium sulphite to the smelting operation as a source of slagging material.

11. The process of producing elemental sulphur from sulphide ores which comprises, smelting a mixture of ore, carbonaceous reducing agent in amount sufficient to reduce a substantial part of the sulphur dioxide formed to elemental sulphur, and slagging material, separating the elemental sulphur from the accompanying smelter gases, contacting said gases with magnesia whereby it will be converted to magnesium sulphite by sulphur dioxide in said gases, and returning said magnesium sulphite to the smelting operation as a source of slagging material.

RAYMOND F. BACON.